UNITED STATES PATENT OFFICE.

HENRY BLUMENBERG, JR., OF WAKEFIELD, NEW YORK.

POROUS DIAPHRAGM.

SPECIFICATION forming part of Letters Patent No. 578,073, dated March 2, 1897.

Application filed November 15, 1895. Serial No. 569,104. (No specimens.)

*To all whom it may concern:*

Be it known that I, HENRY BLUMENBERG, Jr., a citizen of the United States, residing at Wakefield, in the county of Westchester and State of New York, have invented certain new and useful Improvements in Porous Diaphragms for Electrolyzation-Vats, Galvanic Batteries, and the Like; and I do declare the following to be a full, clear, and exact description of the invention, such as will enable others skilled in the art to which it appertains to make and use the same.

My invention relates to porous diaphragms for electrolyzation-vats, galvanic batteries, and the like.

The object of my improvements is to construct such porous diaphragms of asbestos in any shape or form desired (in some instances it may be made into round cups, square cups, or oval cups, while in other instances it may be used in sheets) and to treat the same in the hereinafter-described manner, by means of which such an article as above named can be produced having certain qualities of excellence over porous diaphragms now in use, such as durability, efficiency, and cheapness. The material from which this porous diaphragm is made is asbestos. This is first formed into the desired shape and a suitable binding material added. It is then subjected to an acid bath, preferably sulfuric or nitric acid, for a short time, after which it is baked in a furnace under intense heat. This intense heat changes the asbestos from a fibrous into a crystalline state.

The acid bath serves to eliminate any metallic oxid which may be in the asbestos and toughens and hardens the same, an important requisite in the manufacture of the asbestos porous diaphragms.

In making the porous diaphragms, especially the smaller sizes, asbestos retort cement can be used to advantage, but it must be combined with a larger percentage of asbestos than is employed in the manufacture of the ordinary retort cement. I generally take the ordinary retort cement and combine it with some more asbestos fiber, work this into a suitable mass, then force the same into the mold, which is suitable for making the porous diaphragm desired. Intense pressure is needed for this, so that the porous diaphragm, especially if wanted in cup shape, comes out of the mold solid and uniform and not full of holes.

When the porous diaphragm comes from the mold, it is treated with the acid. Then after baking in the furnace it is ready for use.

When porous diaphragms of larger sizes are wanted and the cost of the molds is an objection, the diaphragms can be made from asbestos in sheet form, sewed with asbestos thread, blocked up with wooden molds, and binding material forced on the surface, especially around the seams, so that they are made air and water tight. The diaphragms are then treated in the acid bath and baked.

In using the term "binding material" or "binder" I have reference to silicates of the metals of the alkali or alkaline earths or to the prepared material commonly called "asbestos retort cement" or "asbestos putty," in fact to any of the preparations used in asbestos factories.

In making the porous diaphragms from the asbestos fiber in combination with binding material in order to obtain satisfactory results the same should be forced into the molds under intense pressure, so that the binding material shall be forced into the pores of the asbestos. This result is well-nigh impossible unless intense pressure, such as hydraulic, be used.

The fiber (asbestos) can be put in a suitable mold of the desired shape and the binder can be forced in afterward, or vice versa.

I claim—

1. The herein-described method of making diaphragms, consisting of treating asbestos with acid to remove the metallic salts and toughen it, combining a binding material with the asbestos, forcing the binding material into the pores of the asbestos under high pressure, and finally baking at a high temperature, which changes the asbestos from a fibrous into a crystalline state.

2. The herein-described method of making diaphragms, which consists in treating asbestos with acid to remove the metallic salts and toughen it, and finally forcing binding material into the pores of the asbestos under high pressure.

3. The herein-described method of making diaphragms, which consists in forcing a binding material into the pores of the asbestos, and finally baking the same at a high temperature which changes the asbestos from a fibrous to a crystalline state.

4. The herein-described method of making diaphragms which consists in treating asbestos with acid to remove the metallic salts and toughen it, combining a binding material with the asbestos, and finally baking it at a high temperature which changes the asbestos from a fibrous to a crystalline state.

In testimony whereof I affix my signature in the presence of two witnesses.

HENRY BLUMENBERG, Jr.

Witnesses:
   W. T. WILSON,
   FREDK. OVERBURY.